US011477260B2

(12) United States Patent
Tong et al.

(10) Patent No.: US 11,477,260 B2
(45) Date of Patent: Oct. 18, 2022

(54) SYSTEMS AND METHODS FOR TRANSMISSION OF AUDIO INFORMATION

(71) Applicant: BESTECHNIC (SHANGHAI) CO., LTD., Shanghai (CN)

(72) Inventors: Weifeng Tong, Shanghai (CN); Liang Zhang, Shanghai (CN); Binbin Guo, Shanghai (CN); Lu Chai, Shanghai (CN); Hua Zeng, Shanghai (CN); Zhichen Tu, Shanghai (CN); Xinwei Li, Shanghai (CN); Wenyu Xiao, Shanghai (CN)

(73) Assignee: BESTECHNIC (SHANGHAI) CO., LTD., Shanghai (CN)

( * ) Notice: Subject to any disclaimer, the term of this patent is extended or adjusted under 35 U.S.C. 154(b) by 225 days.

(21) Appl. No.: 16/882,654

(22) Filed: May 25, 2020

(65) Prior Publication Data

US 2021/0203707 A1    Jul. 1, 2021

(30) Foreign Application Priority Data

Dec. 25, 2019   (CN) .......................... 201911353052.6

(51) Int. Cl.
*H04L 65/75*     (2022.01)
*G06F 13/38*     (2006.01)
(Continued)

(52) U.S. Cl.
CPC ............ *H04L 65/75* (2022.05); *G06F 13/382* (2013.01); *G10L 19/022* (2013.01); *H04L 65/80* (2013.01); *G06F 2213/0042* (2013.01)

(58) Field of Classification Search
CPC ..... H04L 65/601; H04L 65/80; G06F 13/382; G06F 2213/0042; G10L 19/022
See application file for complete search history.

(56) References Cited

U.S. PATENT DOCUMENTS

| | | | |
|---|---|---|---|
| 10,050,634 B1 * | 8/2018 | Zhao | ....................... H03L 7/091 |
| 2015/0124058 A1 * | 5/2015 | Okpeva | ................... H04N 7/185 |
| | | | 348/46 |

(Continued)

FOREIGN PATENT DOCUMENTS

| | | |
|---|---|---|
| CN | 105792051 A | 7/2016 |
| CN | 110109643 A | 8/2019 |

*Primary Examiner* — Mohamed A. Wasel
*Assistant Examiner* — Jihad K Boustany
(74) *Attorney, Agent, or Firm* — Bayes PLLC (57) ABSTRACT

Embodiments of systems and methods for transmission of audio information are disclosed herein. In one example, a System on Chip (SoC) includes a wired transceiver module, a wireless module, a Frequency Modulation (FM) demodulation module, and an audio information codec module operatively coupled to the wired transceiver and the FM demodulation module. The wired transceiver module is configured to receive a data packet corresponding to first audio information. The wireless module is configured to receive an FM signal, corresponding to second audio information. The FM demodulation module is configured to output the second audio information based on demodulating the FM signal. The audio information codec module is configured to decode the first audio information and the second audio information based on the data packet and the demodulated FM signal, respectively.

19 Claims, 5 Drawing Sheets

(51) Int. Cl.
*G10L 19/022* (2013.01)
*H04L 65/80* (2022.01)

(56) References Cited

U.S. PATENT DOCUMENTS

| | | | |
|---|---|---|---|
| 2017/0026067 A1* | 1/2017 | Thomas | H03J 1/0008 |
| 2019/0058617 A1* | 2/2019 | Kolsrud | H04L 12/40045 |
| 2020/0221382 A1* | 7/2020 | Konradsson | H04W 48/20 |
| 2021/0144471 A1* | 5/2021 | Dai | H04R 1/1091 |
| 2022/0054049 A1* | 2/2022 | Dalla Bella | A61B 5/6898 |

\* cited by examiner

SYSTEMS AND METHODS FOR TRANSMISSION OF AUDIO INFORMATION

CROSS-REFERENCE TO RELATED APPLICATIONS

This application claims the benefit of priority to Chinese Patent Application No. 201911353052.6, filed on Dec. 25, 2019, which is incorporated herein by reference in its entirety.

BACKGROUND

Embodiments of the present disclosure relate to systems and methods for transmission of audio information.

Loudspeakers, including headphones, have been widely used in daily life. Headphones are a pair of small loudspeaker drivers worn on or around the head over a user's ears, which convert an electrical signal to a corresponding sound.

Conventional Universal Serial Bus (USB) based headphones, such as USB Type-C headphones, do not have a Frequency Modulation (FM) demodulation module for directly demodulating the FM signals from an FM transmitter. The headphones receive the FM signal through a user device such as a smart phone using the USB Type-C connection in between. For example, the FM Radio Frequency (RF) module of the user device may include an antenna disposed in the headphones, for receiving the FM signal. The FM signal is transmitted to the user device using the USB Type-C connection in between. On one hand, the port of the USB Type-C connection interferes with the RF module for receiving the FM signal, and thus have a negative impact on the reception of the FM signal. On the other hand, because the USB Type-C port is usually also used for charging the user device, receiving the FM signal using the USB Type-C connection makes the charging of the user device inconvenient.

SUMMARY

Embodiments of systems and methods for systems and methods for transmission of audio information are disclosed herein.

In one example, a System on Chip (SoC) includes a wired transceiver module, a wireless module, an FM demodulation module, and an audio information codec module operatively coupled to the wired transceiver and the FM demodulation module is disclosed. The wired transceiver module is configured to receive a data packet corresponding to first audio information. The wireless module is configured to receive an FM signal, corresponding to second audio information. The FM demodulation module is configured to output the second audio information based on demodulating the FM signal. The audio information codec module is configured to decode the first audio information and the second audio information based on the data packet and the demodulated FM signal, respectively.

In another example, a method for audio information transmission using a System on Chip (Soc) including a wired transceiver module, a wireless module, an FM demodulation module, and an audio information codec module shared by the wired transceiver module and the FM demodulation module is disclosed. The method includes receiving, by the wired transceiver module, a data packet corresponding to first audio information. The method also includes receiving, by the wireless module, an FM signal, corresponding to second audio information. The method further includes outputting, by the FM demodulation module, the second audio information based on demodulating the FM signal. The method yet includes decoding, by an audio information codec module, the first audio information, and the second audio information based on the data packet and the demodulated FM signal, respectively.

In still another example, a system for audio information transmission is disclosed. The system includes a USB transceiver module, an RF module, an FM demodulation module, and an audio information codec module operatively coupled to the USB transceiver module and the FM demodulation module. The USB transceiver module is configured to receive a data packet corresponding to first audio information. The RF module is configured to receive an FM signal, corresponding to second audio information. The FM demodulation module is configured to output the second audio information based on demodulating the FM signal. The audio information codec module is configured to decode the first audio information and the second audio information based on the data packet and the demodulated FM signal, respectively.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings, which are incorporated herein and form part of the specification, illustrate the presented disclosure and, together with the description, further serve to explain the principles of the disclosure and enable a person of skill in the relevant art(s) to make and use the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Although specific configurations and arrangements are discussed, it should be understood that this is done for illustrative purposes only. It is contemplated that other configurations and arrangements can be used without departing from the spirit and scope of the present disclosure. It is further contemplated that the present disclosure can also be employed in a variety of other applications.

It is noted that references in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it is contemplated that such feature, structure, or characteristic may also be used in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Universal Serial Bus (USB) based headphones (e.g., headphones based on USB Type-C connector system) is a type of wired headphones that receive data (e.g., audio information) from a USB host (e.g., a smart phone or a computer) through a physical bus (e.g., a USB cable that links the headphones with the USB host). The data can be transmitted based on a USB protocol (e.g., USB 1.0, USB 2.0, USB 3.0, etc.). For example, the host can transmit data (video, music, audio, or data packets) to the USB Type-C headphones using a USB cable. Comparing to traditional headphones (e.g., headphones using 3.5 mm connector for data transmission), the USB Type-C headphones can allow the data to stay in the digital domain for longer and thus can preserve the quality of the signal encoded better.

FM has been widely used for radio broadcasting. Audio signals can be encoded and transmitted via FM by encoding the audio information in a carrier wave by varying the instantaneous frequency of the wave. For example, the audio information can be represented by the frequency deviation (i.e., the difference between the frequency of the carrier wave and its center frequency), such as having the frequency deviation being proportional to the modulated signal. Or the audio information can be encoded and transmitted by shifting the carrier's frequency among a predefined set of frequencies representing the data using modulation techniques, such as frequency-shift keying (FSK). Because FM radio broadcasting has a better signal-to-noise ratio comparing to other broadcasting methods (e.g., Amplitude Modulation (AM) broadcasting), FM is widely used in broadcasting music or other audio information.

Conventional USB Type-C headphones receive FM signals through the FM module in the user device connected. For example, the FM signal is received by a wireless transceiver of a smart phone and be transmitted to the USB Type-C headphones for playing through the USB Type-C connection. Because USB data packet transmission and the FM signal transmission are based on the same communication link, the quality of the audio information transmitted on both transmission connections is negatively impacted by the sharing. Also, receiving and demodulating the FM signal takes system resources (e.g., computing power and memory space) of the user device, using the user device for receiving the FM signal will negatively impact the user device's performance.

When using USB communication, information is transmitted in packet form. Conventional the USB Type-C connections suffer from the risk of jitter (i.e., the timing error when reading the data) especially when the communication between the host and the headphone is at the speed of full-Speed (e.g., 12 Mbit/s), high-Speed (480 Mbit/s) or higher. Performing clock synchronization can improve the data read accuracy by reducing and/or avoiding the data misread caused by the timing error. This can thus improve the data transmission's quality and the stability of the headphone.

Thus, an accurate clock system within the headphones' processing unit to synchronizing the host's clock (e.g., the remote clock in the user device) and a local clock (e.g., the USB clock used for demodulating and decoding the data packet) is important. Conventional headphones use crystal-based oscillators for such a clock synchronization, which makes the processing unit expensive and bulky. On the other hand, when receiving and demodulating the broadcasted FM signals, an accurate clock system is also needed to avoid jitter, which can reduce the quality and accuracy of the received FM signal.

As will be disclosed in detail below, among other novel features, audio information transmission systems (e.g., a System on Chip (SoC)) including a wired module (e.g., a USB transceiver module for receiving data packets), a wireless module (e.g., RF module for receiving FM signals), an FM demodulation module and an audio information codec module shared by the USB transceiver module and the FM demodulation module, disclosed herein can achieve integrating the USB module and the FM module on a single integrated chip. This can save the system resource of the user device, increase the quality of the audio information transmitted and allow a mix of the audio information transmitted through both the USB connection and the FM broadcasting.

Moreover, the FM module and the USB module of the system disclosed herein use a shared clock system (e.g., the local clocks for demodulating and decoding the data packet and the FM signal are correlated), and thus can ensure the accuracy of the local clock of both the FM module and the USB module. By doing so, the risk of jitter can be avoided while the number of components for "clock synchronization" can be reduced (e.g., only need one phase-lock-loop (PLL) and may not need a crystal oscillator for clock synchronization).

Last but not least, by sharing the audio information codec module by the FM module and the USB module for decoding the audio information received, the overall size and cost of the SoC can be further reduced.

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

Figure 1:
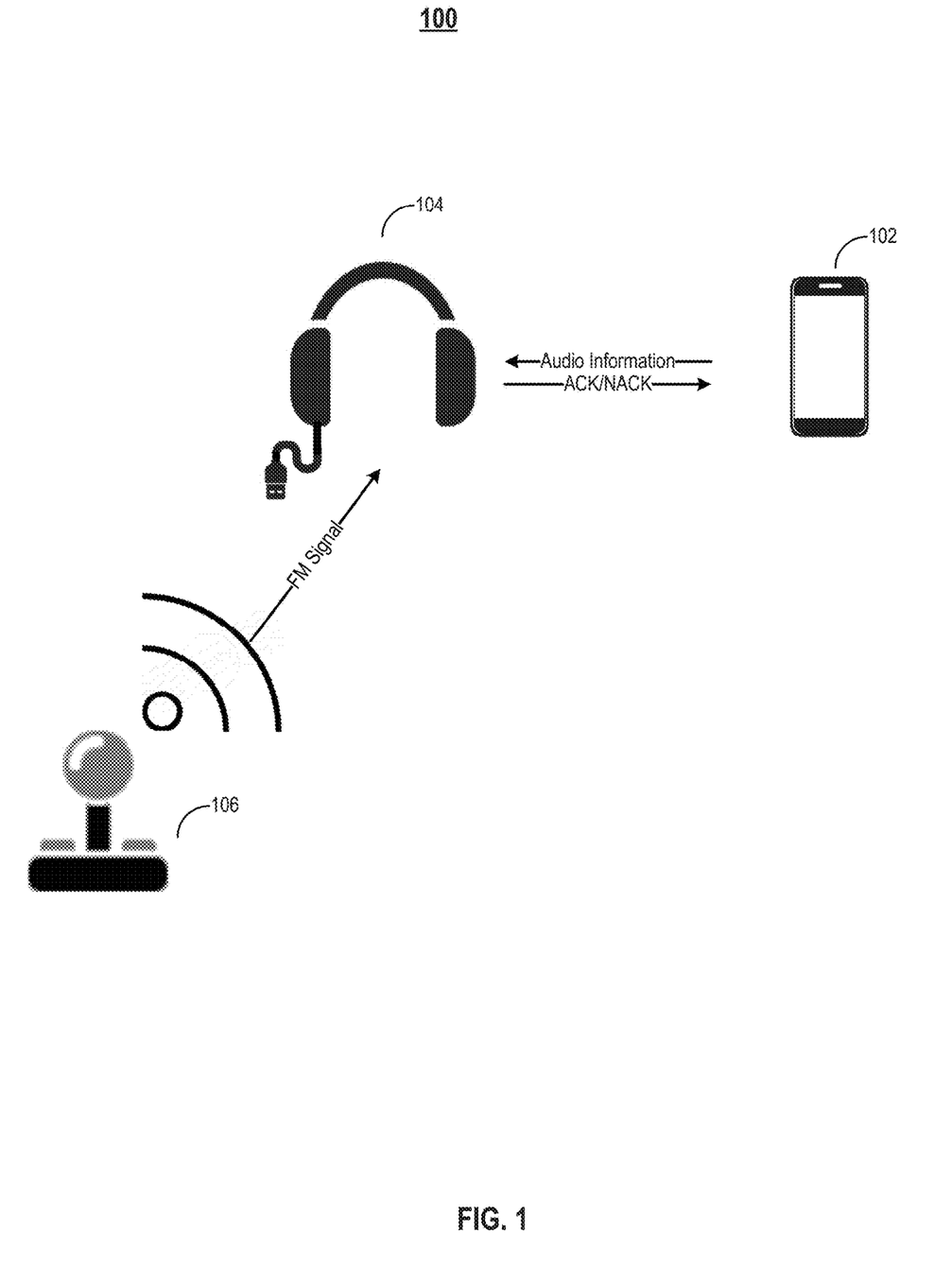
FIG. 1 is a block diagram illustrating an exemplary headphone system in accordance with various embodiments.

FIG. 1 is a block diagram illustrating an exemplary headphone system 100 in accordance with various embodiments. As illustrated in FIG. 1, headphone system 100 can include a user device 102, a USB based headphone 104

(referred to as "headphone 104" hereinafter), and an FM transmitter 106. In some embodiments, a USB communication link can be established between user device 102 and headphone 104 using a physical bus such as a USB cable (not shown) connecting headphone 104 and user device 102. The audio information can be modulated and transmitted in data packet(s) based on a USB protocol (e.g., USB 1.0, USB 2.0, USB 3.0, etc.). In some embodiments, headphone 104 can directly receive the FM signals from FM transmitter 106. FM signals may be modulated based on a carrier wave and be transmitted to headphone 104 through broadcasting.

User device 102 may be any suitable device that can provide data packets including video and/or audio information including, for example, video, music, or voice in the digital format. User device 102 may include, but is not limited to, a handheld device (e.g., dumb or smart phone, tablet, etc.), a wearable device (e.g., eyeglasses, wrist watch, etc.), a radio, a music player, an electronic musical instrument, an automobile control station, a gaming console, a television set, a laptop computer, a desktop computer, a netbook computer, a media center, a set-top box, a global positioning system (GPS), or any other suitable device.

Headphone 104 can include a pair of loudspeakers that can be worn on or around the head over a user's ears. Headphone 104 can also include any electroacoustic transducers that convert an electrical signal (e.g., representing the audio information provided by user device 102) to a corresponding sound. In some embodiments, headphone 104 can include a pair of earbud (also known as earpiece) that can plug into the user's ear canal or a headset including headphone units that are physically held by a band over the head and/or electrically connected by a cord. In some embodiments, headphone 104 may further include a speaker to play the sound decoded from the audio information encoded in the data packets.

FM transmitter 106 includes an FM transmitter that can broadcast FM radio over an FM broadcast band. For example, the FM broadcast band can be from 87.5 MHz to 108.0 MHz. In some embodiments, FM transmitter 106 may be a radio station, configured to modulate a carrier wave according to the audio information to be transmitted. In some other embodiments, FM transmitter 106 may be a personal FM transmitter with a limited power level/field strength, configured to broadcast audio information received from a portable audio device (e.g., an MP3 player) to a standard FM radio. It is contemplated that FM transmitter 106 is not limited to the present examples and can be any device suitable for broadcasting an FM signal.

In some embodiments, the audio information transmitted by the FM signal and/or the data packet may be a stream of audio stereo information in the form of compressed or uncompressed stereo samples for first and second audio channels, such as left-channel audio information and right-channel audio information or the like. In some embodiments, the audio information may be mono audio information in a single audio channel or audio information in more than two separate audio channels (e.g., left, central, and right channels).

As shown in FIG. 1, bidirectional communications can be established between user device 102 and headphone 104. Data packets can be transmitted from user device 102 to headphone 104, and reception status messages such as acknowledgment messages (e.g., acknowledgment messages (ACK) or negative acknowledgment (NACK)) can be transmitted back to user device 102 from headphone 104. In some embodiments, a USB communication link can be established between user device 102 and headphone 104 using the physical bus. Headphone 104 can receive audio information encoded in data packets in digital form.

In some embodiments, the data packets can be transmitted by user device 102 according to the USB protocol at a low-speed rate (e.g., about 1.5 Mbit/s), a full-speed rate (e.g., about 12 Mbit/s), a high-speed rate (e.g., about 480 Mbit/s) or a higher speed rate (e.g., at superspeed rate or superspeed+rate). In some embodiments, the data packets include a synchronization sequence (i.e., Start of Frame (SOF)), such as an 8-bit synchronization sequence, a 32-bit synchronization sequence, etc. In some embodiments, for decoding the data packets received from user device 102, headphone 104 can use a clock synchronization system (e.g., a System on Chip (SoC)) for synchronizing the user device's clock and the local clock in headphone 104. The synchronization sequence within the data packets can be used for clock synchronization (e.g., for determining a remote clock representing the host clock) when decoding the data packets by a physical layer module of headphone 104.

Headphone 104 can also receive broadcasted FM signals from FM transmitter 106. Audio signals can be encoded and transmitted via FM by encoding the audio information in a carrier wave by varying the instantaneous frequency of the wave. In some embodiments, the audio information can be represented by the frequency deviation (i.e., the difference between the frequency of the carrier and its center frequency), such as having the frequency deviation being proportional to the modulated signal. In some embodiments, the audio information can be encoded and transmitted by shifting the carrier's frequency among a predefined set of frequencies representing the data using modulation techniques, such as frequency-shift keying (FSK). When demodulating and/or decoding the FM signals, the FM demodulation module of headphone 104 has high accuracy in local time for demodulating the FM signal by using the clock system (e.g., a clock system that includes synchronized digital oscillator(s)) disclosed herein. This can increase the quality and accuracy of the audio information received through the FM broadcasting, and reduce the number of PLL (e.g., only need one for correlating the clock synchronization system of the FM broadcasting and the clock synchronization system of the USB communication) used for clock synchronization.

In some embodiments, audio information received by headphone 104 from user device 102 and FM transmitter 106 can be mixed. For example, the FM signal received from FM transmitter 106 can be resampled to a sample rate equals to a sample rate of the audio information received from user device 102.

Figure 2:
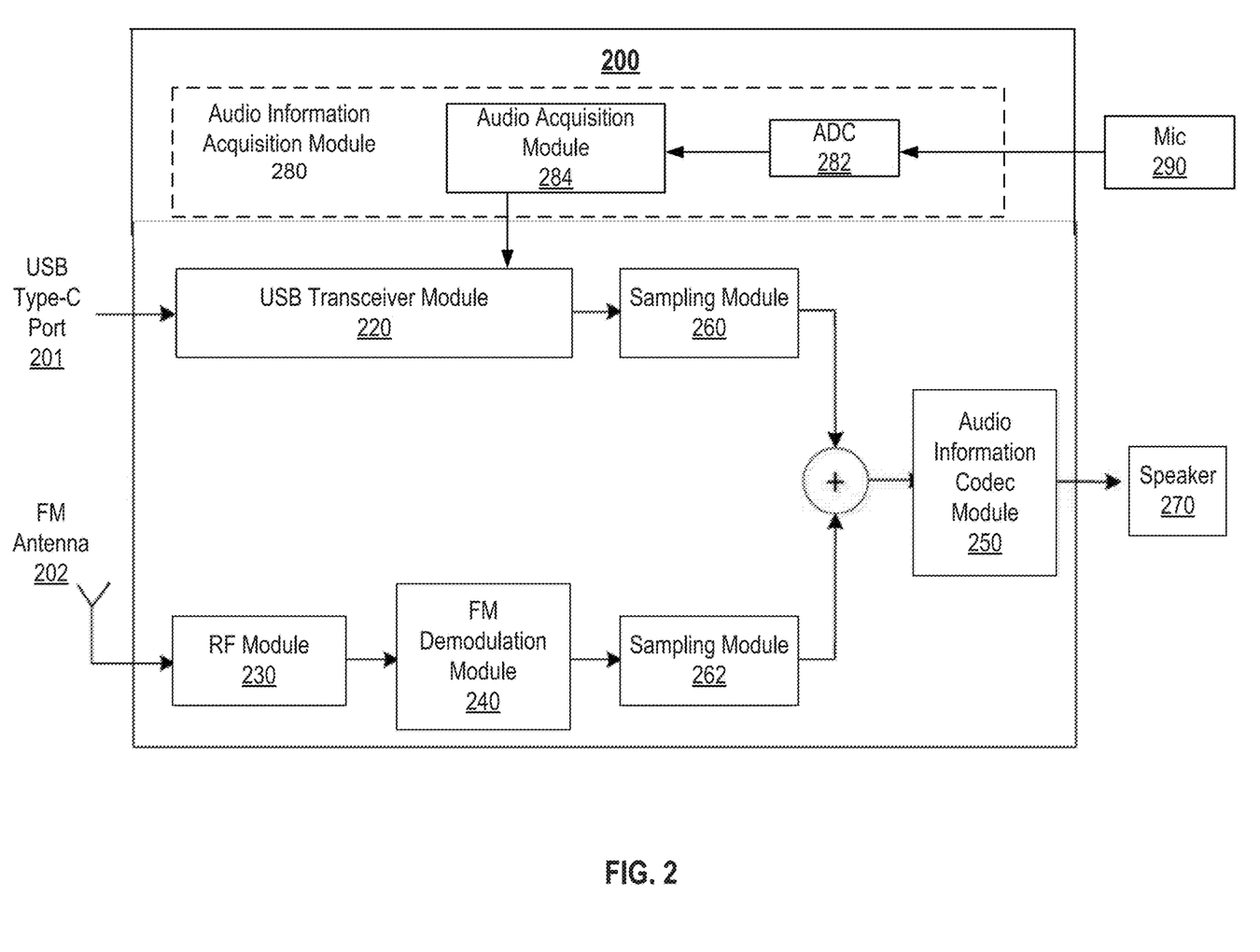
FIG. 2 is a detailed block diagram of an exemplary System on Chip (SoC) in accordance with various embodiments.

FIG. 2 is a detailed block diagram of an exemplary SoC 200, used by headphone 104 in accordance with various embodiments. In some embodiments, SoC 200 integrates a USB transceiver module 220 for receiving data packet(s) corresponding to first audio information from a user device, and an RF module 230 for receiving FM signals corresponding to second audio information from an FM transmitter on a single chip, such that the headphone (e.g., headphone 104) can directly receive and process both the audio information received through the USB communication and the audio information received through the FM signals broadcasted by the FM transmitter. In some embodiments, Soc 200 further includes an FM demodulation module 240 for demodulating the received FM signal and an audio information codec module 250 shared by USB transceiver module 220 and FM demodulation module 240, for outputting the first and the second audio information based on demodulating the FM signal and the data packet respectively. In some embodiments, an audio information codec module 250 may also be configured to mix the first audio information and the second audio information to generate third audio information to be played by a speaker 270 of the headphone. In some embodiments, speaker 270 may include a left speaker configured to play a left channel sound of the audio information and a right speaker configured to play the right channel sound of the audio information. In some embodiments, the left speaker may connect to SoC 200 through an LP pin and an LN pin, and the right speaker may connect to SoC 200 through an RP pin and an RN pin. In some other embodiments, the left and right speakers may play the same audio information if the audio information is mono audio information in a single audio channel.

It is contemplated that FM demodulation module 240 may resample the FM signal, or audio information codec module 250 may resample the second audio information to a sample rate equals to a sample rate of the first audio information before the first and the second audio information are mixed by audio information codec module 250. In some embodiments, upon having the same sample rate, the headphone can switch to play one of the first audio information and the second audio information, while playing the another audio information.

In some embodiments, the local clock used by USB transceiver module 220 for demodulating the data packet and the local clock used by FM demodulation module 240 for demodulating the FM signal are correlated. For example, Soc 200 may include a first oscillator (not shown) for generating a first clock and a reference clock generated based on the first clock. The first clock may be generated based on an interval of start-of-frames (SoFs) of the data packet. USB transceiver module 220 may demodulate the data packet using the first clock. Soc 200 may also include a second oscillator for generating a second clock and a third clock generated based on the second clock. FM demodulation module 240 may demodulate the FM signal using the third clock. In some embodiments, the second clock is determined based on a carrier frequency of the FM signal. The second oscillator may be calibrated based on synchronizing the second clock with the reference clock using a PLL. Accordingly, the local clock used by USB transceiver module 220 for demodulating the data packet and the local clock used by FM demodulation module 240 for demodulating the FM signal can be associated and correlated for improving the quality and accuracy of the FM signal reception. The clock synchronization system will be disclosed in greater detail below along with the discerption of FIG. 3.

It is understood that additional module(s) may be included in SoC 200, in the same integrated circuit (IC) chip in which USB transceiver module 220, RF module 230, FM demodulation module 240, and audio information codec module 250 are formed. An SoC may combine the required electronic circuits of various computer components onto a single, integrated chip (IC). An SoC may be a complete electronic substrate system that may contain analog, digital, mixed-signal, or RF functions.

As illustrated in FIG. 2, USB transceiver module 220 can be configured to receive data packets from a host (e.g., user device 102 in FIG. 1) and transmit acknowledgment messages (e.g., ACK or NACK) to the host indicative of the successful reception of the audio information or not through a USC port (e.g., a USB Type-C port 201). USB transceiver module 220 can implement a USB communication protocol, such as USB 1.0, USB 2.0, USB 3.0, or any of the variation of the standard USB communication protocols. USB transceiver module 220 is configured to receive the data packets from the host and extract the clock information and the audio information from the data packets. In some embodiments, according to the standard USB protocol, the physical channel of the USB connection is divided into 8-bit bytes. For example, a data packet includes a plurality of SoF tokens (e.g., an incrementing frame number) for synchronization, and a payload for 0-1024 bytes, following a payload identifier. The interval(s) between the SoFs, can be used for clock synchronization. For example, a counter may be used for counting the number of the clock signals (e.g., the number of periodic/alterations of the clock signal generated by the oscillator) during the interval(s) between the SoFs. A difference between the counted value and a predetermined value is determined. In some embodiments, the predetermined value can be determined based on the communication protocol or an agreement. In some other embodiments, the predetermined value can be determined based on the clock signal generated by the oscillator. In some embodiments, the predetermined value can be the number of the clock cycles during 1 ms. The difference may be configured to calibrate the oscillator generating the clock signal.

RF module 230 may be configured to receive the audio information modulated to a carrier wave (e.g., from 80.0 MHz to 108.0 MHz), via an antenna 202. In some embodiments, antenna 202 may include an array of conductors for receiving radio waves at one or more RF bands corresponding to RF module 230. As described above, the audio information may be any music and/or voice information provided by the FM transmitter. For example, the audio information may be a stream of audio stereo information in the form of compressed or uncompressed stereo samples for first and second audio channels, such as left-channel audio information and right-channel audio information or the like. In some embodiments, the audio information may be mono audio information in a single audio channel or audio information in more than two separate audio channels (e.g., left, central, and right channels).

FM demodulation module 240 may be configured to demodulate the audio information from the carrier wave (e.g., from 80.0 MHz to 108.0 MHz). For example, FM demodulation module 240 may demodulate the FM signal received by RF module 230. In some embodiments, an analog-to-digital converter may be disposed between RF module 230 and FM demodulation module 240 such that the received analog signal may be converted into a digital form for demodulation.

In some embodiments, the first audio information demodulated by USB transceiver module 220 and second audio information demodulated by FM demodulation module 240 may be resampled by sampling modules 260 and 262, respectively, such that the first audio information and the second audio information may have the same sample rate. For one example, sampling module 262 may resample the second audio information demodulated by FM demodulation module 240 to a sample rate equals the sample rate of the first audio information. In another example, sampling module 262 may resample the FM signal to a sample rate equals the sample rate of the first audio information. In some embodiments, sampling modules 260 and 262 may be part of USB transceiver module 220 and FM demodulation module 240 respectively. For example, sampling modules 260 may be part of USB transceiver module 220 and sampling modules 262 may be part of FM demodulation module 240.

In some embodiments, SoC 200 further includes audio information codec module 250 shared by USB transceiver module 220 and FM demodulation module 240 for decoding the first audio information and the second audio information. For example, audio information codec module 250 may decode the first audio information, and the second audio information from the bits modulated in the demodulated data packet and the frequency deviations modulated in the FM signal, respectively using algorithm(s) corresponding to the modulation format. Audio information codec module 250 may decode the demodulated data packet and the FM audio signal from digital form to analog form and may send the first audio information and the second audio information for a speaker 270 to play. In some embodiments, audio information codec module 250 may also generate third audio information by mixing the first audio information and the second audio information. For example, audio information codec module 250 may use an adder for adding the first audio information and the second audio information. In some embodiments, the first audio information and the second audio information may be of different channels such as of left-channel audio information and of right-channel audio information or the like, or may be of the same audio information channel and thus can enhance the audio information reception.

Figure 4:
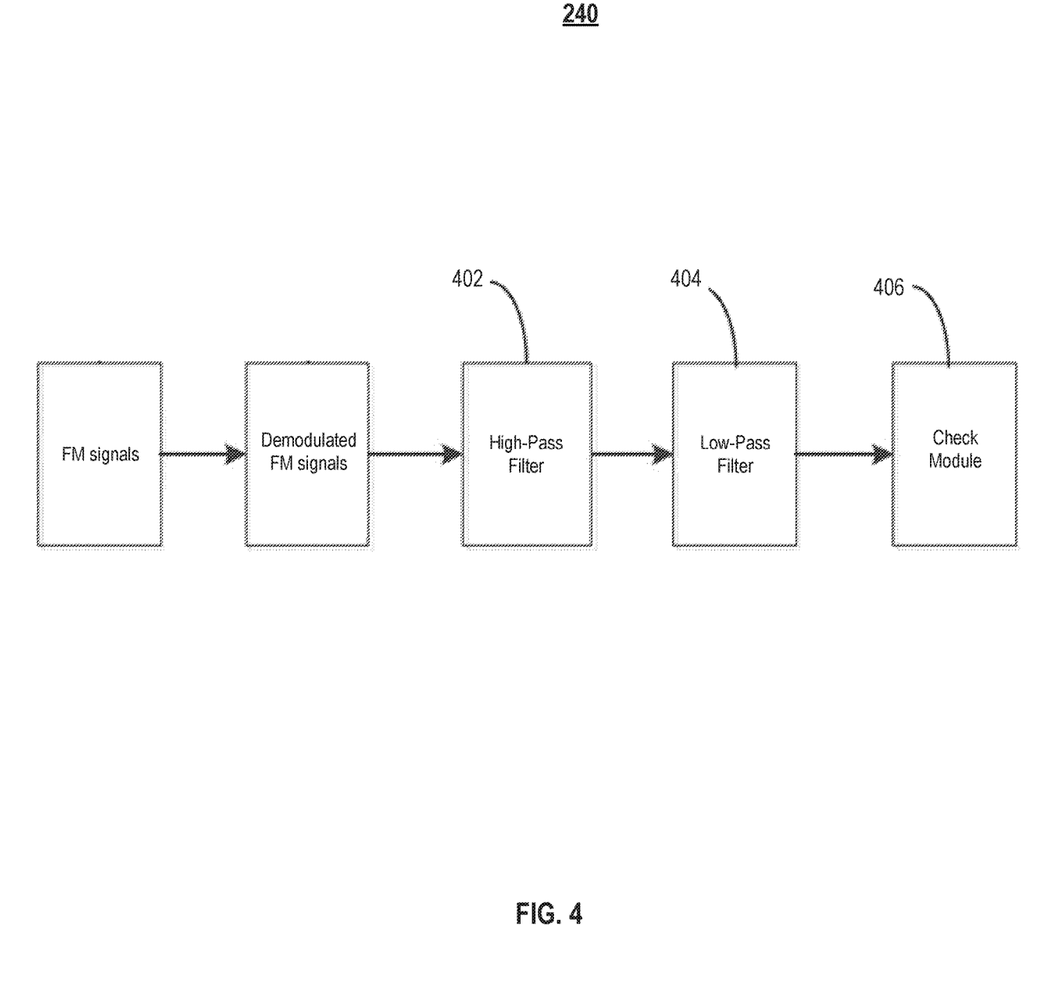
FIG. 4 is a detailed block diagram of an exemplary FM demodulation module in accordance with various embodiments.

In some embodiments, as illustrated in FIG. 4, FM demodulation module 240 may further include a high-pass filter 402 for filtering out signals higher than a predetermined frequency (e.g., a first cutoff frequency) and a low-pass filter 404 for filtering out signals lower than another predetermined frequency (e.g., a second cutoff frequency, higher than the first cutoff frequency) within the demodulated FM signal, and may also include a check module 406 for checking if the FM signal is received from the correct FM transmitter. In some embodiments, the first cutoff frequency is about 59 KHz and the second cutoff frequency is higher than the first cutoff frequency (e.g., 70 KHz, 80 KHz, 90 KHz, etc.).

For example, FM demodulation module 240 may demodulate the FM signal according to equation (1):

$$S_m(t) = A \cos[\omega_c t + \int_{-\infty}^{t} kfm(t)dt] \quad (1)$$

where $S_m(t)$ represents the carrier signal, t is time, A is the amplitude of the signal, $\omega_c$ is the frequency of the carrier wave, kf is the sensitivity of the demodulation, m(t) represents the demodulated FM signal.

In some embodiments, the cutoff frequency of high-pass filter 402, $f_0$ is higher than the signal frequency components in m(t). For example, $f_0$ may be about 59 KHz. The signal frequency components herein refer to the frequency deviations corresponding to the audio information encoded in the FM signal. In some embodiments, when the audio information is from a single channel of a multiple channel sound (e.g., including first and second audio channels, such as left-channel audio information and right-channel audio information or the like), the signal frequency components may include signals for about 0-19 KHz. In some embodiments, when the audio information is Stereo sound audio information in a single audio channel, the signal frequency components may include a pilot signal for about 0-19 KHz and a double-side-band signal for around 38 KHz. In some embodiments, if Radio Broadcast Data System (RBDS) and Radio Data System (RDS) are supported, the signal frequency components may include a demodulated digital signal for about 57 KHz. Accordingly, to ensure the cutoff frequency of high-pass filter 402 $f_0$ is higher than the signal frequency components in m(t), f0 may be set as about 59 KHz.

In some embodiments, check module 406 may check if the FM signal is from a true FM transmitter based on checking the energy of the demodulated FM signal m(t) after passing high-pass filter 402 (i.e., the energy of noise). For example, check module 406 may check if the energy of the demodulated FM signal m(t) after passing high-pass filter 402 is higher than a predetermined threshold. If no, the FM signal may be considered as received from a true FM transmitter (e.g., a real FM station). Otherwise, the FM signal may be considered as "noise" and be discard accordingly. This can improve the user experience when using the FM function of the headphone. In some embodiments, check module 406 may also determine the quality of the FM signal based on the energy of the demodulated FM signal m(t) after filtering out the signal frequency components (e.g., passing the high-pass filter). For example, the higher the energy is, the lower the quality the FM signal may have.

In some embodiments, SoC 200 may optionally include an audio information acquisition module 280 for picking-up sound from the environment (e.g., human voices, audio of interest, noise, etc.). For example, SoC 200 may include a microphone 290 for obtaining the sound of interest such as human voices (e.g., for voice control, making a phone call or talk-through purposes), environmental noise (e.g., for active-noise-control (ANC) purposes), etc. The sound of interest may be converted by an ADC 282 to a digital form and be transmitted to audio acquisition module 284. The picked-up audio signal can then be transmitted to USB transceiver module 220 for further processing and be used for purposes such as voice control, recording, voice communication etc. In some embodiments, microphone 290 is connected to SoC 200 through a MIC pin and a GND pin.

In some embodiments, SoC 200 may further include a first and a second oscillator for providing local clocks (e.g., clock signals) for USB transceiver module 220, FM demodulation module 240 and audio information codec module 250 to process the data packet and the FM signal. The clock generated by the first and the second oscillator are correlated, and thus can increase the quality and accuracy of the data received (e.g., avoid jitter). Additionally, to perform the clock synchronization of the system, fewer components are needed (e.g., one less PLL) as a result. For example, FIG. 3 is a detailed block diagram of an exemplary clock system 300 used by SoC 200 in accordance with various embodiments.

Figure 3:
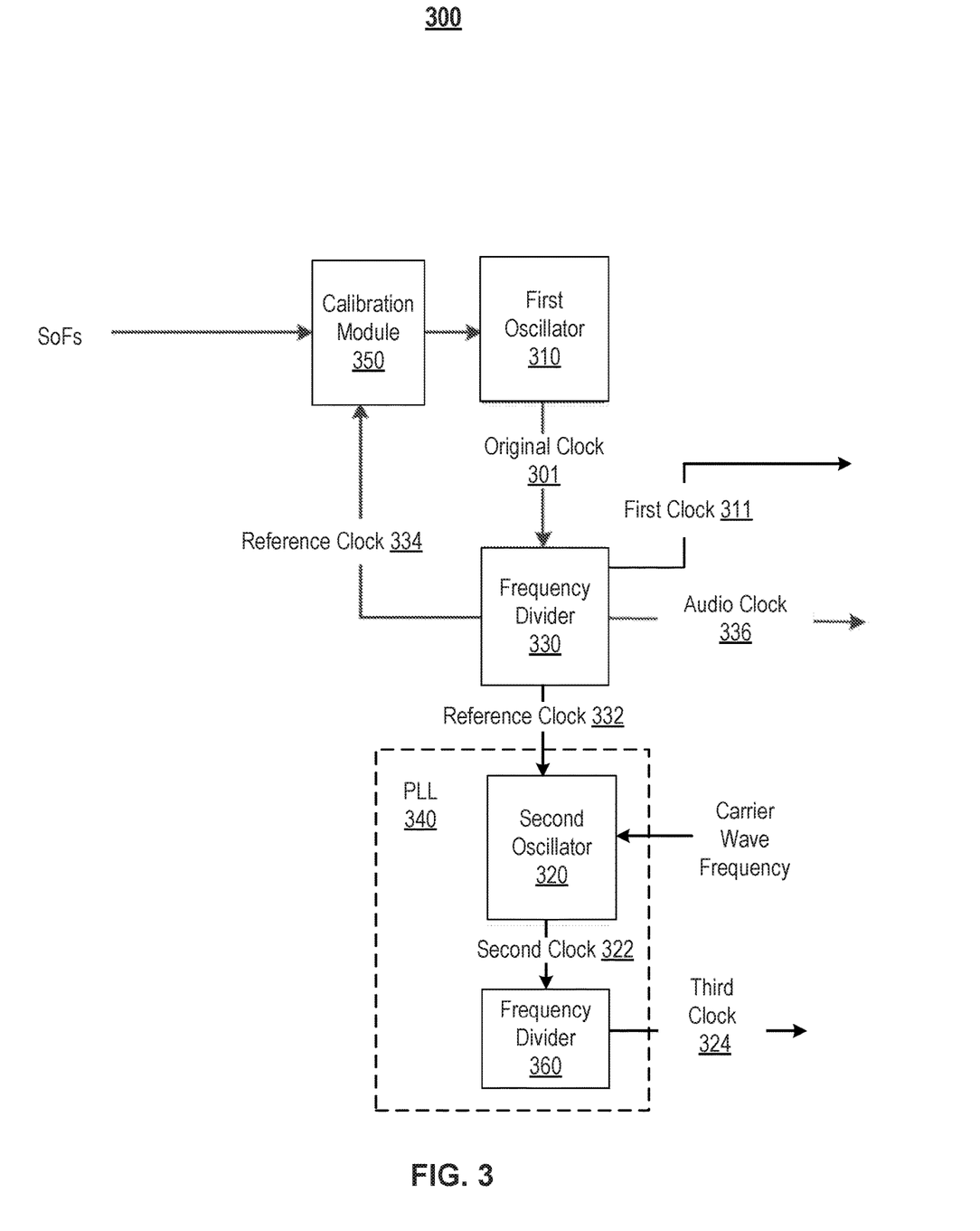
FIG. 3 is a detailed block diagram of an exemplary clock system in accordance with various embodiments.

As illustrated in FIG. 3, in some embodiments, clock system 300 includes a first oscillator 310 and a second oscillator 320, configured to generate a first clock 311 for the USB transceiver module to demodulate the data packet and a third clock 324 for the FM demodulation module to demodulate the FM signal respectively. Second oscillator 320 can be calibrated based on a clock signal generated by first oscillator 310 such that the clock signal for the FM signal demodulation and the clock signal for the data packet demodulation can be correlated and synchronized. As a result, the second oscillator 320 needn't a crystal or a crystal oscillator as its reference clock. Instead, the second oscillator 320 use the clock signal generated by first oscillator 310 as its reference clock.

In some embodiments, first oscillator 310 and second oscillator 320 each includes a digital oscillator circuit (e.g., an oscillator circuit free of a crystal). For example, first oscillator 310 and second oscillator 320 may be an inductor-capacitor oscillator circuit (LCOSC) or a ring oscillator circuit (ROSC). In some embodiments, the frequency of an original clock 301 generated by first oscillator 310 can be about 2.4G Hz (e.g., 2.5G Hz, 2.6G Hz, 2.9G Hz, 3G Hz, 3.1G Hz, etc.). Original clock 301 can then be divided by a frequency divider (e.g., frequency divider 330) for generating a synchronization clock 334 and a reference clock 332 for calibration. Original clock 301 can also be divided by the frequency divider for generating first clock 311 for the USB transceiver module to demodulate the data packet, and an audio clock 336 for the audio information codec to decode the audio information to sound respective. Similarly, the frequency of a second clock 322 generated by second oscillator 320 can be about 2.4G Hz (e.g., 2.5G Hz, 2.6G Hz, 2.9G Hz, 3G Hz, 3.1G Hz, etc.). The reference clock 332 can be used for calibrating second oscillator 320 (e.g., synchronizing second clock 322 with reference clock 332 using a PLL 340). In some embodiments, PLL 340 may include second oscillator 320, frequency divider 360 and a frequency and phase detection module (not shown) for synchronizing second clock 322 and reference clock 332. For example, an second synchronization clock (not shown) and reference clock 332 can be inputs of the frequency and phase detection module, where PLL module may apply a fractional divider to second clock 322 to generate the second synchronization clock, which is almost the same as the reference clock 332 in frequency. PLL 340 may output a calibration signal for calibrating second oscillator 320. In some embodiments, PLL module may apply a low-pass filter to the calibration signal for filtering before the calibration signal is applied to second oscillator 320 for calibration.

Second clock 322 can be divided by a frequency divider (e.g., frequency divider 360) to generate third clock 324 for the FM demodulation module to demodulate the FM signal.

In some embodiments, the oscillator circuit free of a crystal (e.g., first oscillator 310 and/or second oscillator 320) is designed such that the frequency of the original clock (e.g., original clock 301 and/or second clock 322) can be adjusted based on adjusting at least one component of the oscillator circuit. For example, the frequency of the original clock generated by first oscillator 310 and/or second oscillator 320 can be adjusted by adjusting the capacitance of a capacitor unit connected to the LCOSC. In some embodiments, the capacitor unit includes multiple capacitors connected in parallel. By controlling the connection of at least one branch of the multiple capacitors (e.g., the on/off of a digital logic control switch on that branch), the capacitance of the capacitor unit can be adjusted. It is appreciated that the method for adjusting the capacitance of the capacitor unit is not limited to the example disclosed herein. Other suitable adjustment methods can also be applied for adjusting the capacitance of the capacitor unit.

Because LCOSC has good phase noise characteristics and their ease of implementation (e.g., the circuit takes less space on a Printed Circuit Board (PCB) and cost less than a crystal based on oscillator circuit), by using the oscillator circuit(s) free of crystal instead of a crystal-based oscillator, clock system 300 can be smaller in size and can be cheaper for cost comparing to conventional SoC for clock synchronization.

In some embodiments, first oscillator 310 can generate original clock 301 and transmit original clock 301 to frequency divider 330 for generating first clock 311, reference clock 332, synchronization clock 334, and audio clock 336. In some embodiments, first clock 311 can be used by the USB transceiver module for demodulating the data packet. Audio clock 336 can be used by the audio information codec for further decoding the audio information modulated in the data packet received by the USB transceiver module and the FM signal received by the RF module collectively or respectively. Reference clock 332 can be used for calibrating second oscillator 320 (will be disclosed with greater detail below). Synchronization clock 334 can be transmitted to calibration module 350 for calibrating first oscillator 310 based on intervals between SoFs of the data packets received by the USB transceiver module. For example, when the data packet is transmitted at a full-speed rate, the interval between each SoF may be 1.00 ms±0.0005 ms. For another example, when the data packet is transmitted at a high-speed rate, the interval between each SoF may be 125 μs±0.0625 μs.

In some embodiments, calibration module 350 may include a counter for counting the number of the clock signals (e.g., the number of periodic/alterations of the clock signal generated by the oscillator. For example, a difference can be determined based on the counted value and a predetermined value. Calibration module 350 can calibrate the frequency of original clock 301 generated by first oscillator 310 based on the difference as disclosed above.

Second oscillator 320 can generate second clock 322 involving in calibrating second oscillator 320 and can transmit second clock 322 to frequency divider 360 for generating a third clock 324 for demodulating the FM signal. For example, second clock 322 may be generated based on multiplying the carrier frequency of the FM signal offset by an intermediate frequency corresponding to the FM signal, by a coefficient P, such that second clock 322 can about 2.4G Hz (e.g., 2.5G Hz, 2.6G Hz, 2.9G Hz, 3G Hz, 3.1G Hz, etc.). For example, the FM signal may be modulated based on a carrier wave between about 87.5 MHz to 108.0 MHz where the intermediate frequency may be about 200 kHz, 262 kHz, 455 kHz, etc. P may be a half-integer or integer, and when multiplying the shifted carrier wave (i.e., the carrier frequency of the FM signal offset by the corresponding intermediate frequency), will make the second clock 322 be about 2.4G Hz. In some embodiments, second clock 322 may then be synchronized with reference clock 332 to be exactly 2.4G Hz.

In some embodiments, reference clock 332 and second clock 322 can be synchronized using PLL 340. For example, second clock 322 and reference clock 332 can be inputs of the frequency and phase detection module of PLL 340, where the frequency and phase detection module may apply a fractional divider to second clock 322 and reference clock 332, modulated based on a sigma-delta modulation (SDM) module. PLL 340 may output a calibration signal for calibrating second oscillator 320. In some embodiments, the frequency and phase detection module may apply a low-pass filter to the calibration signal for filtering before the calibration signal is applied to second oscillator 320 for calibration. Accordingly, second oscillator 320 may further be calibrated based on reference clock 332, by synchronizing second clock 322 with reference clock 332.

In some embodiments, frequency divider 360 may generate third clock 324 by dividing second clock 322 by a coefficient M. In some embodiments, frequency divider 360 may adjust coefficient M such that a frequency of the third clock stays substantially the same when demodulating another FM signal of a different frequency channel (e.g., based on a different carrier wave). It is contemplated that coefficient M can be any suitable half-integers or integers to realize the purpose described herein. In this way, when demodulating the FM signals from different channels (e.g., from 80.0 MHz to 108.0 MHz) by the FM demodulation module, the sample rate of the FM signals from different channels may stay substantially the same and thus, the cutoff frequencies of different filters (e.g., the first cutoff frequency of high-pass filter 402 and the second cutoff frequency of low-pass filter 404) in the FM demodulation module may need only small variances.

Because first oscillator 310 can be precisely calibrated based on SoFs of the data packet, and because second oscillator 320 is calibrated based on clock signal(s) (e.g., reference clock 332) generated by first oscillator 310, third clock 324 generated by second oscillator 320 can be accurate for demodulating the FM signal accordingly. Thus, when using third clock 324 as the local time for receiving and demodulating the FM signal, the SoC disclosed herein may increase the quality and accuracy of the FM signal received by avoiding jitter in signal reception and demodulation.

In other embodiments, clock system 300 may further include a crystal oscillator (not shown) for generating a crystal oscillator clock. For one example, the crystal oscillator clock may be used as a reference clock for calibrating first oscillator 310, such that first oscillator 310 need not be calibrated based on SoFs of the data packet. Second oscillator 320 may still be calibrated based on first oscillator 310, according to the mechanism disclosed above. For another example, the crystal oscillator may replace first oscillator 310 for generating original clock 301. As crystal oscillators are more accurate for generating a clock signal, the crystal oscillator does not need to be calibrated based on SoFs of the data packet. Second oscillator 320 may still be calibrated based on the crystal oscillator, similar to the mechanism used for being calibrated based on first oscillator 310 disclosed above.

Including a crystal oscillator by clock system 300 can increase the accuracy of the generated clock signals, and thus the oscillators may not need to be calibrated based on the SoFs of the data packet. This can reduce the computing power used by clock system 300. The more accuracy the generated clock signals are, the more reliable the demodulation of the first audio information and/or the second audio information can be.

Figure 5:
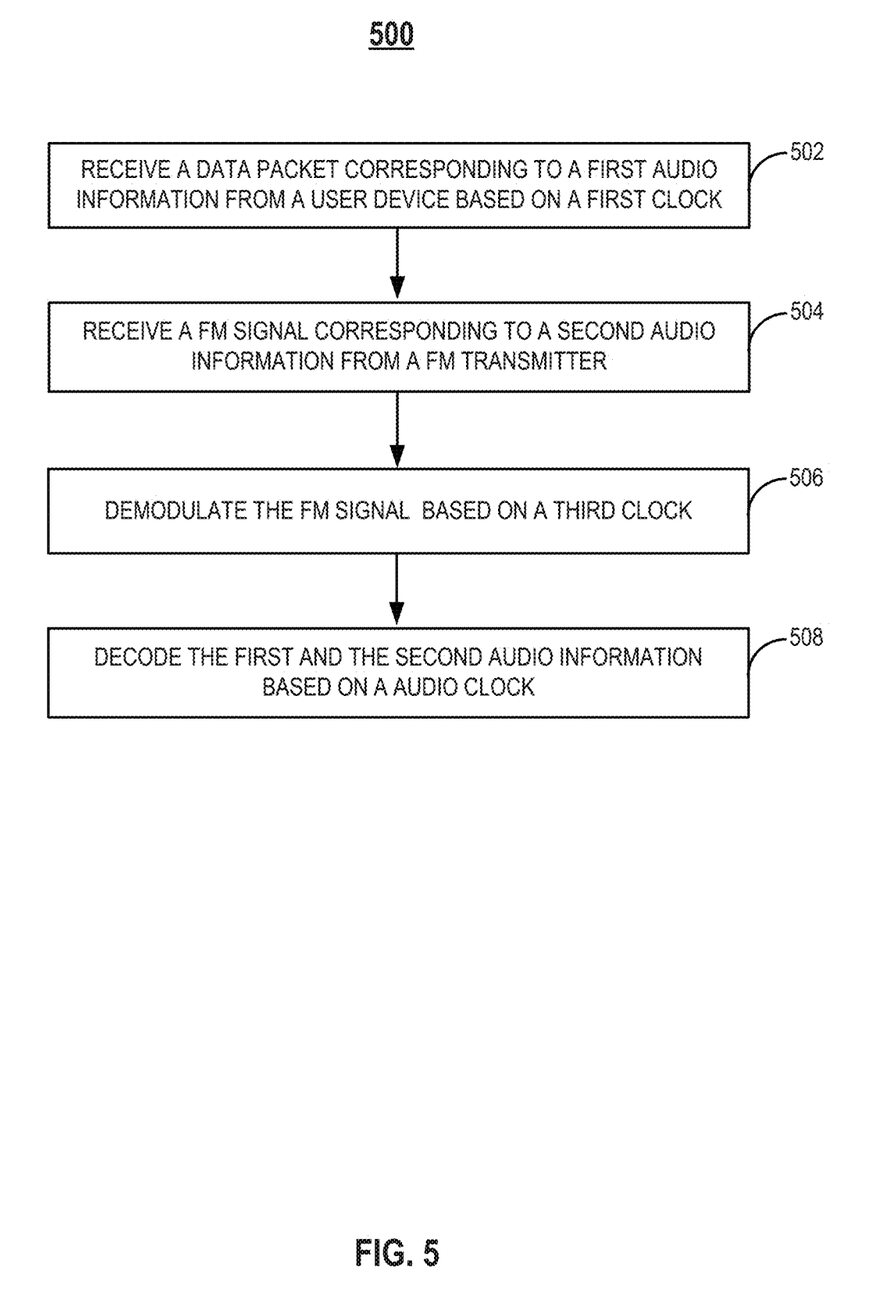
FIG. 5 is a flow chart illustrating an exemplary method for transmission of audio information in accordance with an embodiment.

FIG. 5 is a flow chart illustrating an exemplary method 500 for transmission of audio information in accordance with an embodiment. Method 500 can be performed by processing logic that can comprise hardware (e.g., circuitry, dedicated logic, programmable logic, microcode, etc.), software (e.g., instructions executed on a processing device), or a combination thereof. It is to be appreciated that not all operations may be needed to perform the disclosure provided herein. Further, some of the operations may be performed simultaneously or in a different order than shown in FIG. 5, as will be understood by a person of ordinary skill in the art.

Method 500 shall be described with reference to FIGS. 1, 2, and 3. However, method 500 is not limited to that exemplary embodiment. In method 500, data packet(s) corresponding to first audio information and FM signal(s) corresponding to second audio information are received, demodulated, and decoded using an integrated chip, based on correlated local clocks. In some embodiments, the first and second audio information may also be mixed for generating third audio information.

Starting at step 502, a data packet corresponding to first audio information is received by a wired transceiver (e.g., a USB transceiver) from a user device (e.g., a smart phone). The data packet is demodulated based on a clock signal (e.g., a first clock) generated by a first oscillator (e.g., a digital oscillator). For example, the data packet may be transmitted through a physical bus (e.g., a cable and a USB Type-C port) and is demodulated by the USB transceiver based on the first clock.

In step 504, an FM signal corresponding to second audio information is received by a wireless transceiver (e.g., an RF module) from an FM transmitter (e.g., a radio station). For example, the RF module may receive the FM signal broadcasted by the FM transmitter.

In step 506, the FM signal is demodulated by an FM demodulation module based on a clock signal (e.g., a third clock) generated by a second oscillator (e.g., a digital oscillator). For example, the FM signal can be modulated according to equation (1) disclosed above. The second oscillator may generate a second clock based on multiplying the carrier frequency of the FM signal offset by an intermediate frequency corresponding to the FM signal, by a coefficient P. In some embodiments, the coefficient P is a half-integer or an integer, and when being multiplied with the offset carrier frequency, the second frequency may be about 2.4 GHz. The second oscillator may generate the third clock by dividing the second clock by a coefficient M (e.g., using a divider). In some embodiments, the coefficient M is also a half-integer or an integer, and M can be adjusted based on the carrier frequency of the FM signal such that the frequency of the third clock stays substantially the same when demodulating another FM signal of a different frequency channel by the FM demodulation module.

In step 508, the first audio information (e.g., the demodulated data packet) and/or the second audio information (e.g., the demodulated FM signal) are decoded by an audio information codec based on an audio clock generated by the first oscillator. The decoded first and/or the second audio information may be transmitted to and be played by a speaker.

In some embodiment, method 500 may further include generating third audio information, using the audio information codec, based on mixing the first audio information and the second audio information. For example, the FM signal or the second audio information may be resampled by the FM demodulation module or a resampling module to a sample rate equals to a sample rate of the first audio information. The second audio information having the same sample rate with the first audio information can be mixed with the first audio information to generate the third audio information.

In some embodiments, method 500 also may also include determining the quality of the FM signal based on calculating the energy of the demodulated FM signal after filtering out the signal frequency components (e.g., passing the high-pass filter). For example, the signal quality may be considered good when the energy of the demodulated FM signal after filtering out the signal frequency components is low. In some embodiments, the energy of the demodulated FM signal can be used for determining if the FM signal is received from a true radio station. For example, if the energy of the demodulated FM signal after filtering out the signal frequency components is higher than a predetermined threshold, the FM signal can be determined to be noise. Otherwise, the FM signal may be determined as received from the true radio station.

In some embodiments, method 500 may yet include calibrating the first and the second oscillators collectively based on interval(s) of SoFs of the data packet. In some embodiments, the first oscillator may be calibrated based on intervals of SoFs of the data packet. For example, a synchronization clock may be generated based on the first clock (e.g., using a divider), and a calibration module may synchronize the synchronization clock with a host clock (e.g., the clock in the user device) based on the SoFs of the data packet. The second oscillator may be calibrated based on the first oscillator. For example, the second clock may be synchronized with another reference clock generated based on the first clock by the first oscillator, using a PLL. In some embodiments, the second oscillator is calibrated, such that the second clock is nearly 2.4 GHz. Accordingly, the local time for demodulating the FM signal (e.g., the third clock generated by the second oscillator) can be more accurate, and the quality and the accuracy of the second audio information demodulated from the FM signal can be increased as a result.

In some embodiments, method 500 alternatively may include calibrating the first and the second oscillators collectively based on a crystal oscillator. For example, the reference clock generated based on the first clock (e.g., using a divider), may be synchronized with the crystal oscillator clock (e.g., the clock signal generated by the crystal oscillator). The second oscillator may still be calibrated based on the first oscillator, similar to the mechanism disclosed above.

Using a crystal oscillator for clock synchronization can improve the accuracy of the clock signals generated, and thus improve the data read accuracy by reducing and/or avoiding the data misread caused by the timing error. This can thus improve the data transmission's quality and the stability of the headphone. Moreover, by avoid synchronizing the clock system using the SoFs of the data packet, the clock system can take less computing power for performing clock synchronization.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure or the appended claims in any way.

While the present disclosure has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the present disclosure should not be limited by any of the above-described exemplary embodiments but should be defined only in accordance with the following claims and their equivalents.

What is claimed is:

1. A System on Chip (SoC), comprising:
 a wired transceiver sub-circuit configured to receive a data packet corresponding to first audio information;
 a wireless sub-circuit configured to receive a Frequency Modulation (FM) signal corresponding to second audio information, wherein the wireless sub-circuit includes an RF sub-circuit;
 an FM demodulation sub-circuit configured to output the second audio information based on demodulating the FM signal;
 a first oscillator configured to:
  generate a first clock, wherein the wired transceiver sub-circuit is further configured to demodulate the data packet based on the first clock; and
  generate a reference clock based on the first clock, wherein the FM demodulation sub-circuit is configured to demodulate the FM signal based on the reference clock,
  wherein the first oscillator is calibrated based on an interval of start-of-frames (SoFs) of the data packet; and
 an audio information codec sub-circuit, operatively coupled to the wired transceiver sub-circuit and the FM demodulation sub-circuit, configured to decode the first audio information and the second audio information based on the data packet and the demodulated FM signal respectively.

2. The SoC of claim 1, wherein:
 the FM demodulation sub-circuit is further configured to resample the second audio information with a sample rate equals to a sample rate of the first audio information; and
 the audio information codec sub-circuit is further configured to mix the first audio information and the second audio information based on the data packet and the demodulated FM signal.

3. The SoC of claim 1, wherein:
 the wired transceiver sub-circuit includes a Universal Serial Bus (USB) transceiver sub-circuit.

4. The SoC of claim 3, further comprising: a second oscillator, configured to:
 generate a second clock based on a carrier frequency of the FM signal; and
 generate a third clock based on dividing the second clock by a first coefficient, wherein the FM demodulation sub-circuit is further configured to demodulate the FM signal based on the third clock, and
 wherein the second oscillator is calibrated based on the reference clock using a phase lock loop (PLL).

5. The SoC of claim 4, wherein the second clock is generated based on multiplying the carrier frequency of the FM signal offset by an intermediate frequency corresponding to the FM signal, by a second coefficient.

6. The SoC of claim 4, wherein the wireless sub-circuit is further configured to adjust the first coefficient based on the carrier frequency of the FM signal, wherein a frequency of the third clock stays substantially the same when demodulating another FM signal of a different frequency channel by the FM demodulation sub-circuit.

7. The SoC of claim 4, wherein the second oscillator is calibrated based on synchronizing the second clock with the reference clock using the PLL.

8. The SoC of claim 6, wherein the first coefficient is adjusted based on choosing a predetermined first coefficient, corresponding to the carrier frequency of the FM signal.

9. The SoC of claim 5, wherein the first coefficient and the second coefficient are half-integers or integers.

10. The SoC of claim 1, further comprising a crystal oscillator, configured to generate a crystal oscillator clock, wherein the crystal oscillator is calibrated, and
 the first oscillator is calibrated based on the crystal oscillator clock.

11. The SoC of claim 1, wherein to resample the second audio information with a sample rate that equals to a sample rate of the first audio information, the FM demodulation sub-circuit is further configured to resample (i) the FM signal in the FM demodulation sub-circuit, or (ii) the second audio information decoded by the audio information codec sub-circuit, to a sample rate of the first audio information.

12. A method for audio information transmission using a System on Chip (SoC), comprising:
receiving, by the SoC, a data packet corresponding to first audio information;
receiving, by the SoC, an FM signal corresponding to second audio information;
generating, by a first oscillator of the SoC, a first clock, wherein the SoC is further configured to demodulate the data packet based on the first clock;
generating, by the first oscillator of the SoC, a reference clock based on the first clock, wherein the SoC is configured to demodulate the FM signal based on the reference clock;
outputting, by the SoC, the second audio information based on the FM signal; and
decoding, by the SoC, the first audio information and the second audio information based on the data packet and the demodulated FM signal, respectively,
wherein the first oscillator is calibrated based on an interval of start-of-frames (SoFs) of the data packet.

13. The method of claim 12, further comprising:
resampling, by the SoC, the second audio information with a sample rate equals to a sample rate of the first audio information; and
mixing, by the SoC, the first audio information and the second audio information based on the data packet and the demodulated FM signal.

14. The method of claim 12, further comprising:
generating, by a second oscillator, a second clock based on a carrier frequency of the FM signal; and
generating, by the second oscillator, a third clock based on dividing the second clock by a first coefficient, wherein the SoC is further configured to demodulate the FM signal based on the third clock,
wherein the second oscillator is calibrated based on the reference clock using a phase lock loop (PLL).

15. The method of claim 14, wherein the second clock is generated based on multiplying the carrier frequency of the FM signal offset by an intermediate frequency corresponding to the FM signal, by a second coefficient.

16. The method of claim 15, wherein the first coefficient and the second coefficient are half-integers or integers.

17. The method of claim 15, further comprising:
adjusting the first coefficient based on the carrier frequency of the FM signal, wherein a frequency of the third clock stays substantially the same when demodulating another FM signal of a different frequency channel by the SoC.

18. A system for audio information transmission, comprising:
a Universal Serial Bus (USB) transceiver sub-circuit configured to receive a data packet corresponding to first audio information;
a Radio Frequency (RF) sub-circuit configured to receive a Frequency Modulation (FM) signal corresponding to second audio information;
an FM demodulation sub-circuit configured to output the second audio information based on demodulating the FM signal;
a first oscillator configured to:
generate a first clock, wherein the USB transceiver sub-circuit is further configured to demodulate the data packet based on the first clock; and
generate a reference clock based on the first clock, wherein the FM demodulation sub-circuit is configured to demodulate the FM signal based on the reference clock,
wherein the first oscillator is calibrated based on an interval of start-of-frames (SoFs) of the data packet; and
an audio information codec sub-circuit, operatively coupled to the USB transceiver sub-circuit and the FM demodulation sub-circuit, configured to decode the first audio information and the second audio information based on the data packet and the demodulated FM signal respectively.

19. The system of claim 18, wherein:
the FM demodulation sub-circuit is further configured to resample the second audio information with a sample rate that equals to a sample rate of the first audio information; and
the audio information codec sub-circuit is further configured to mix the first audio information and the second audio information based on the data packet and the demodulated FM signal.

* * * * *